(12) United States Patent
Tsai

(10) Patent No.: US 8,156,353 B2
(45) Date of Patent: Apr. 10, 2012

(54) TECHNIQUES FOR COMMUNICATIONS POWER MANAGEMENT BASED ON SYSTEM STATES

(75) Inventor: Jr-Shian Tsai, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 702 days.

(21) Appl. No.: 12/208,824

(22) Filed: Sep. 11, 2008

(65) Prior Publication Data

US 2009/0077395 A1 Mar. 19, 2009

Related U.S. Application Data

(60) Provisional application No. 60/973,038, filed on Sep. 17, 2007, provisional application No. 60/973,031, filed on Sep. 17, 2007, provisional application No. 60/973,035, filed on Sep. 17, 2007, provisional application No. 60/973,044, filed on Sep. 17, 2007.

(51) Int. Cl.
*G06F 1/00* (2006.01)
*G06F 11/00* (2006.01)

(52) U.S. Cl. ........................................ 713/310; 370/231

(58) Field of Classification Search .................. 713/300, 713/400, 500, 310, 320, 324, 340; 370/229
See application file for complete search history.

(56) References Cited

U.S. PATENT DOCUMENTS

| | | | | |
|---|---|---|---|---|
| 6,611,676 B2 * | 8/2003 | Ue et al. | ........................... | 455/69 |
| 6,934,914 B1 * | 8/2005 | Vittal et al. | ................... | 715/763 |
| 7,127,391 B2 * | 10/2006 | Chang et al. | .................. | 704/230 |
| 7,310,380 B1 * | 12/2007 | Young et al. | .................. | 375/295 |
| 7,710,868 B2 * | 5/2010 | Tsukizawa | ..................... | 370/229 |
| 7,817,998 B1 * | 10/2010 | Tse et al. | ...................... | 455/423 |
| 7,869,360 B2 * | 1/2011 | Shi | ................ | 370/231 |
| 2003/0054825 A1 * | 3/2003 | Chen et al. | ..................... | 455/442 |
| 2004/0252632 A1 * | 12/2004 | Bourdoux et al. | ............ | 370/210 |
| 2005/0195859 A1 * | 9/2005 | Mahany | ....................... | 370/478 |
| 2005/0239411 A1 * | 10/2005 | Hazra et al. | ................ | 455/67.11 |
| 2006/0035653 A1 * | 2/2006 | Karaoguz et al. | ............. | 455/500 |
| 2006/0142026 A1 * | 6/2006 | Al-Baghdadi | ............. | 455/456.3 |
| 2008/0233885 A1 * | 9/2008 | Agahi et al. | .................... | 455/69 |

* cited by examiner

*Primary Examiner* — Thomas Lee
*Assistant Examiner* — Phil Nguyen
(74) *Attorney, Agent, or Firm* — Kacvinsky Daisak PLLC

(57) ABSTRACT

Techniques for communications based power management based on system states are described. An apparatus may comprise a communications sub-system having a control policy module, a controller and a first transceiver capable of operating at different communications rates. The control policy module may be operative to receive computing power state information and communications state information, determine a communications rate parameter for the first transceiver based on the computing power state information and the communications state information, and instruct the controller to modify a communications rate for the first transceiver based on the communications rate parameter. Other embodiments are described and claimed.

23 Claims, 4 Drawing Sheets

TECHNIQUES FOR COMMUNICATIONS POWER MANAGEMENT BASED ON SYSTEM STATES

CROSS REFERENCE TO RELATED APPLICATIONS

This application is a non-provisional of, and claims priority to U.S. Patent Provisional Application Ser. No. 60/973,038 titled "TECHNIQUES FOR COMMUNICATIONS POWER MANAGEMENT BASED ON SYSTEM STATES" filed on Sep. 17, 2007, and is related to U.S. Patent Provisional Application Ser. No. 60/973,031 titled "BUFFERING TECHNIQUES FOR POWER MANAGEMENT" filed on Sep. 17, 2007, U.S. Patent Provisional Application Ser. No. 60/973,035 titled "TECHNIQUES FOR COMMUNICATIONS BASED POWER MANAGEMENT" filed on Sep. 17, 2007, and U.S. Patent Provisional Application Ser. No. 60/973,044 titled "TECHNIQUES FOR COLLABORATIVE POWER MANAGEMENT FOR HETEROGENEOUS NETWORKS" filed on Sep. 17, 2007, all three of which are hereby incorporated by reference in their entirety.

BACKGROUND

Power management for electronic devices such as computer systems play an important part in conserving energy, managing heat dissipation, and improving overall system performance. Modern computers systems are increasingly designed to be used in settings where a reliable external power supply is not available making power management to conserve energy important. Power management techniques allow certain components of a computer system to be powered down or put in a sleep mode that requires less power than while in active operation, thereby reducing the total amount of energy consumed by a device over some period of time. Energy conservation is especially important for mobile devices to conserve battery power. Even when reliable external power supplies are available careful power management within the computing system can reduce heat produced by the system enabling improved performance of the system. Computing systems generally have better performance at lower ambient temperatures because key components can run at higher speeds without damaging their circuitry. Consequently, there are many advantages to enhancing power management for electronic devices.

DETAILED DESCRIPTION

Figure 1:
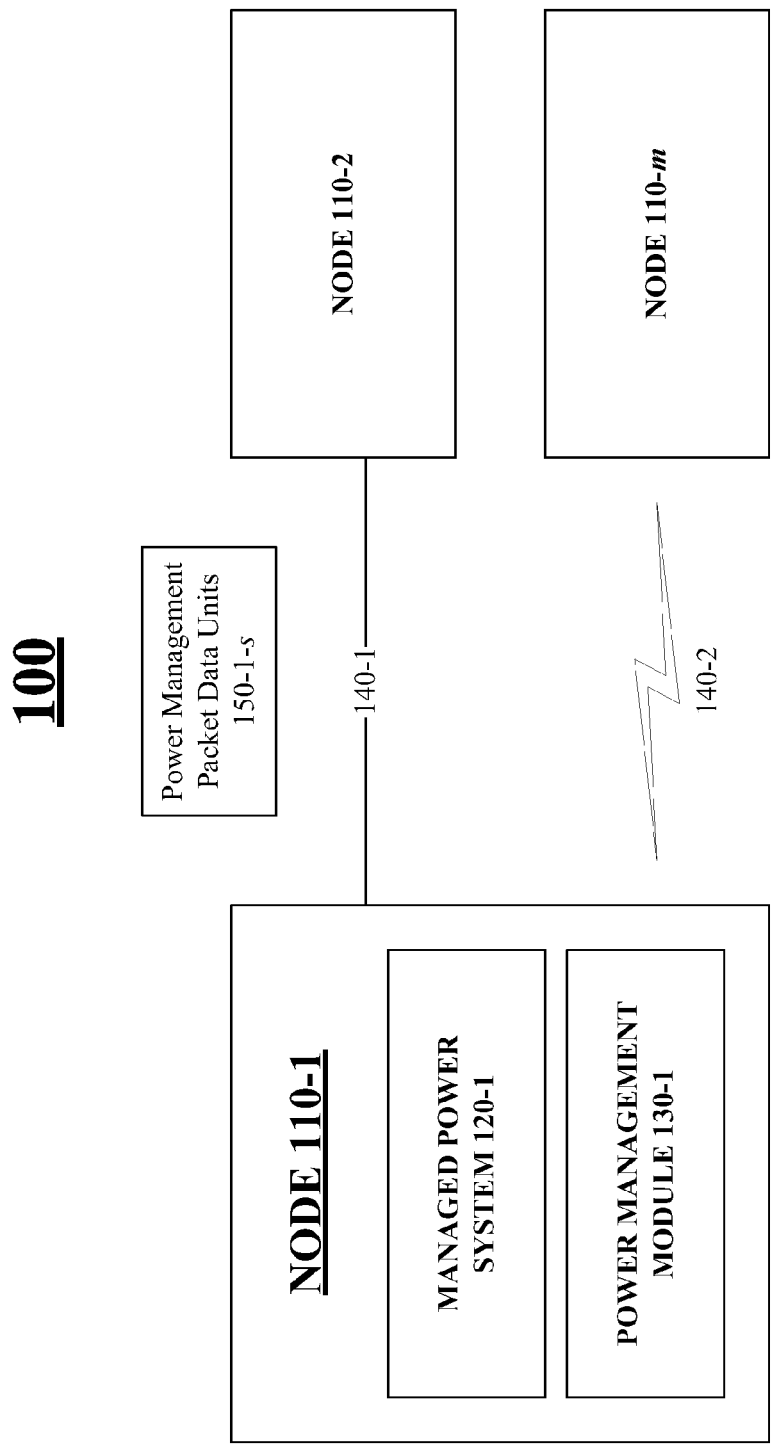
FIG. 1 illustrates one embodiment of a communications system.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments may be generally directed to techniques for communications power management based on system or platform power states. Some embodiments may be particularly directed to enhanced power management techniques to manage power states for a communications portion of a node using computing power state information for a computing portion of the node. In one embodiment, for example, the computing power state information may be communicated over a communications bus and uniform interfaces between the various portions of a node using various power management messages. Examples for a node may include various types of heterogeneous network endpoint and infrastructure devices or resources, such as computers, servers, switches, routers, bridges, gateways, and so forth. The computing power state information may indicate, for example, whether a computing portion of a given node is operating in a power-managed state or a full-computation state, the duration for a power-managed state, a resume latency to exit from a power-managed state, and other power related characteristics for the computing portion of the node. The computing power state information may be used to perform power management operations for the communications portion of the node. For example, the computing power state information may be used by a control policy to select a communications rate or link rate for the communications portion of the node, thereby directly or indirectly selecting a power state for the communications portion of the node. In another example, the computing power state information may be used to directly switch the communications portion of the node to another power state. The power management techniques may be implemented, for example, by power gating and/or clock gating various hardware elements of a node, thereby conserving battery power.

In one embodiment, an apparatus such as a network device may include a managed power system and a power management module to manage power states for the managed power system. The managed power system may comprise, for example, any devices, components, modules, circuits, or other portions of the node drawing power from a power source, such as a battery. In one embodiment, for example, the managed power system may comprise a computing sub-system. The computing sub-system may include a computing state module operative to determine computing power state information. The computing power state information may include, for example, power states for the computing sub-system, as well as one or more parameters representing certain characteristics of the power states, such as idle durations, resume latencies, and so forth. The computing state module may send a power management message with the computing power state information to the power management module.

The power management module may be operative to communicate power state information with the computing sub-system and the communications sub-system utilizing various power management messages communicated over a communications bus and appropriate interfaces for the node. The power management module may include a power management controller operative to receive the power management message, retrieve the computing power state information from the power management message, and determine a computing power state parameter for the computing sub-system.

The power management controller may send the computing power state information, including the computing power state parameter, to a communications sub-system of the managed power system.

The managed power system may further comprise a communications sub-system. The communications sub-system may include a control policy module and one or more transceivers capable of operating at different communications rates. The control policy module may be operative to receive computing power state information from the power management module, and communications state information from a network state module of the communications sub-system, and determine a communications rate parameter for the one or more transceivers based on the computing power state information and the communications state information. The control policy module may direct a controller to modify a communications rate for the one or more transceivers based on the communications rate parameter. A lower communications rate typically lowers power consumption for the communications sub-system. In this manner, different portions of a node such as a network device may exchange, negotiate and synchronize power state information to improve or enhance power state management for the communications sub-system of the network device in order to facilitate energy conservation across the entire network device.

FIG. 1 illustrates a block diagram of a communications system 100. In various embodiments, the communications system 100 may comprise multiple nodes 110-1-$m$. A node generally may comprise any physical or logical entity for communicating information in the communications system 100 and may be implemented as hardware, software, or any combination thereof, as desired for a given set of design parameters or performance constraints. Although FIG. 1 may show a limited number of nodes in a certain topology by way of example, it can be appreciated that more or less nodes may be employed in different topologies for a given implementation.

In various embodiments, the communications system 100 may comprise, or form part of, a wired communications system, a wireless communications system, or a combination of both. For example, the communications system 100 may include one or more nodes 110-1-$m$ arranged to communicate information over one or more types of wired communications links, such as a wired communications link 140-1. Examples of the wired communications link 140-1 may include without limitation a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The communications system 100 also may include one or more nodes 110-1-$m$ arranged to communicate information over one or more types of wireless communications links, such as wireless shared media 140-2. Examples of the wireless shared media 140-2 may include without limitation a radio channel, infrared channel, radio-frequency (RF) channel, Wireless Fidelity (WiFi) channel, a portion of the RF spectrum, and/or one or more licensed or license-free frequency bands. In the latter case, the wireless nodes may include one more wireless interfaces and/or components for wireless communications, such as one or more radios, transmitters, receivers, transceivers, chipsets, amplifiers, filters, control logic, network interface cards (NICs), antennas, antenna arrays, and so forth. Examples of an antenna may include, without limitation, an internal antenna, an omni-directional antenna, a monopole antenna, a dipole antenna, an end fed antenna, a circularly polarized antenna, a micro-strip antenna, a diversity antenna, a dual antenna, an antenna array, and so forth. In one embodiment, certain devices may include antenna arrays of multiple antennas to implement various adaptive antenna techniques and spatial diversity techniques.

As shown in the illustrated embodiment of FIG. 1, the communications system 100 comprises multiple nodes 110-1-$m$. The nodes 110-1-$m$ may comprise or be implemented as any type of fixed or mobile electronic device or resource, including a network device, network endpoint equipment, network infrastructure equipment, cellular radiotelephone network equipment, a processing system, a computer system, a computer sub-system, a computer, a workstation, a terminal, a server, a personal computer (PC), a laptop computer, an ultra-laptop computer, a portable computer, a handheld computer, a personal digital assistant (PDA), a cellular telephone, a smart phone, a router, a switch, a bridge, a gateway, a network appliance, a microprocessor, an integrated circuit, a programmable logic device (PLD), a digital signal processor (DSP), a processor, a circuit, a logic gate, a register, a microprocessor, an integrated circuit, a semiconductor device, a chip, a transistor, and so forth. In some embodiments, some of the nodes 110-1-$m$ may represent heterogeneous network devices. In one embodiment, for example, the nodes 110-1-$m$ may comprise various mobile computer systems (e.g., laptop computers, handheld computers, smart phones, cellular telephones, and so forth) utilizing a mobile power source, such as one or more batteries.

In various embodiments, the nodes 110-1-$m$ may be arranged to communicate various types of information in multiple communications frames as represented by the power management packet data units (PMPDU) 150-1-$s$ via the network or communications links 140-1, 140-2. In various embodiments, the nodes 110-1-$m$ may be arranged to communicate control information related to power management operations. Examples of control information may include without limitation power information, state information, power state information, power management commands, command information, control information, routing information, processing information, system file information, system library information, software (e.g., operating system software, file system software, application software, game software), firmware, an application programming interface (API), a program, an applet, a subroutine, an instruction set, an instruction, computing code, logic, words, values, symbols, and so forth. The nodes 110-1-$m$ may also be arranged to communicate media information, to include without limitation various types of image information, audio information, video information, AV information, and/or other data provided from various media sources.

Although some of the nodes 110-1-$m$ may comprise different network devices, each of the nodes 110-1-$m$ may include a common number of elements as shown by the node 110-1. For example, the nodes 110-1-$m$ may each include various power management elements to implement a power management scheme operative to perform power management operations for the nodes 110-1-$m$. In the illustrated embodiment shown in FIG. 1, for example, a first node 110-1 may include a managed power system 120-1 coupled to a power management module 130-1. The power management module 130-1 of the first node may be operative to communicate power state information with a second node (e.g., one of the nodes 110-2-$m$) over a communications connection established via the communications links 140-1, 140-2.

In general operation, the power management module 130-1 may manage various power states for the managed power system 120-1 of the node 110-1. The power state information may include past, present or future power states for one or more portions of a managed power system 120-1 of the node 110-1. In this manner, different portions of a managed power system 120-1 may exchange power state information to improve or enhance power state management for the node 110-1. For example, the power management module 130-1 may synchronize power management operations between the sub-systems 210-1, 230-1 of the managed power system 120-1, such as placing communications components of the communications sub-system 210-1 in a lower power state based on operations or anticipated operations for the computing components of the computing sub-system 230-1 for a given communications rate duration period. The lower power state for the communications sub-system 210-1 may be achieved, for example, by switching to a power state for the communications sub-system 210-1 (e.g., Active to Idle), or a lower link rate for the communications sub-system 210-1 (e.g., 10 Gb/s to 100 Mb/s).

Although the node 110-1 is the only node shown in FIG. 1 to include the managed power system 120-1 and the power management module 130-1, it may be appreciated that each of the nodes 110-1-$m$ may include an identical or similar managed power system 120-1-$n$ and power management module 130-1-$p$. For example, the node 110-2 may include a managed power system 120-2 coupled to a power management module 130-2, the node 110-2 may include the elements 120-3, 130-3, and so forth. Furthermore, the descriptions and examples of the structures and operations provided with reference to the managed power system 120-1 and the power management module 130-1 may also apply to the corresponding elements in the other nodes 110-2-$m$. Exemplary embodiments for the managed power system 120-1-$n$ and the power management module 130-1-$p$ may be described in more detail with reference to FIG. 2.

The managed power system 120-1 and the power management module 130-1 may be suitable for various use scenarios or applications. In some embodiments, for example, the managed power system 120-1 and the power management module 130-1 may utilize enhanced power management techniques implemented in the form of one or more control policies for link rate management of a communications device in accordance with the Energy Efficient Ethernet (EEE) project. The goal of the EEE project is to reduce power consumption of network endpoint devices and infrastructure equipment. Many Ethernet communications links are idle most of the time, particularly for nodes implemented as desktop units (e.g., a personal computer or server). An EEE control policy attempts to match link rates with link utilization for power efficiency. Typically lower link rates consume less power. For example, savings potential may be 2 to 4 Watts (W) per link for a 1 Gigabit Per Second (Gb/s) link versus a 100 Megabits Per Second (Mb/s) link, and 10 to 20 W per link for a 10 Gb/s link versus a 1 Gb/s link. As a result, an existing network interface card (NIC) may lower the link rate to save power when entering lower power states for the NIC, such as a sleep power state, idle power state, off power state, and so forth. Switching between link rates, however, needs to be relatively fast to prevent dropping a connection with another endpoint, typically on the order of 1-10 milliseconds (ms) or less.

To support fast switching between link rates, a communications portion of the nodes 110-1-$m$, such as a media access controller, may implement a rapid physical layer (PHY) selection (RPS) technique. RPS is a technique or mechanism for fast switching of link rates, and is typically supported at both ends of a link. RPS techniques may be implemented in a number of different ways, such as through a media access control (MAC) frame handshake operation, for example. RPS is typically limited, however, to rapid switching of link rates only.

RPS needs a control policy to determine when to switch link rates. Designing a control policy for RPS involves balancing multiple design parameters and performance constraints. One fundamental performance trade-off, for example, is time in a given link rate versus packet delay. If design priority is given to lowest possible packet delay, then the network endpoint should only use the highest link rate at all times. If design priority is given to lowest possible energy use, then the network endpoint should only use the lowest link rate at all times. A given design solution attempts to have low and bounded packet delay with maximum energy savings. One way to provide this design solution is by triggering a switch in link rates based on threshold in output buffers. If a queue is above a certain threshold (or watermark) then the nodes 110-1-$m$ switches to a higher link rate. If a queue is below a certain threshold (or watermark) then the network endpoint switches to a lower link rate. This type of control policy alone, however, may cause frequent oscillation between link rates, particularly when traffic is bursty, which is fairly typical for average users. Furthermore, this type of control policy may force the nodes 110-1-$m$ to enter a higher link rate even when priority is given to energy conservation, such as when operating from a mobile power supply such as a battery. In some cases, for example, a user may desire a node 110-1-$m$ to stay in a lower power state and maintain minimally tolerable network performance.

Various embodiments attempt to solve these and other problems. Some embodiments attempt to improve power management for a node 110-1-$m$ by implementing a control policy that supports RPS techniques while allowing a computer system to aggressively and proactively power gate and/or clock gate portions of the computer system. For example, the computer system can manage power levels and link rates for various communications elements based on the power levels and parameters of the computing elements, among other factors. To accomplish this, some embodiments utilize a parameterized communications device power management technique that interfaces with the platform power management architecture and conveys the idle duration, resume latency, and other computing power state information for the computing elements, components, modules, sub-systems or devices. By managing one or more power-related aspects of the communications portions of a node 110-1-$m$ based on computing power state information, the node 110-1-$m$ may realize enhanced energy conservation and utilize limited power resources such as batteries more efficiently.

Figure 2:
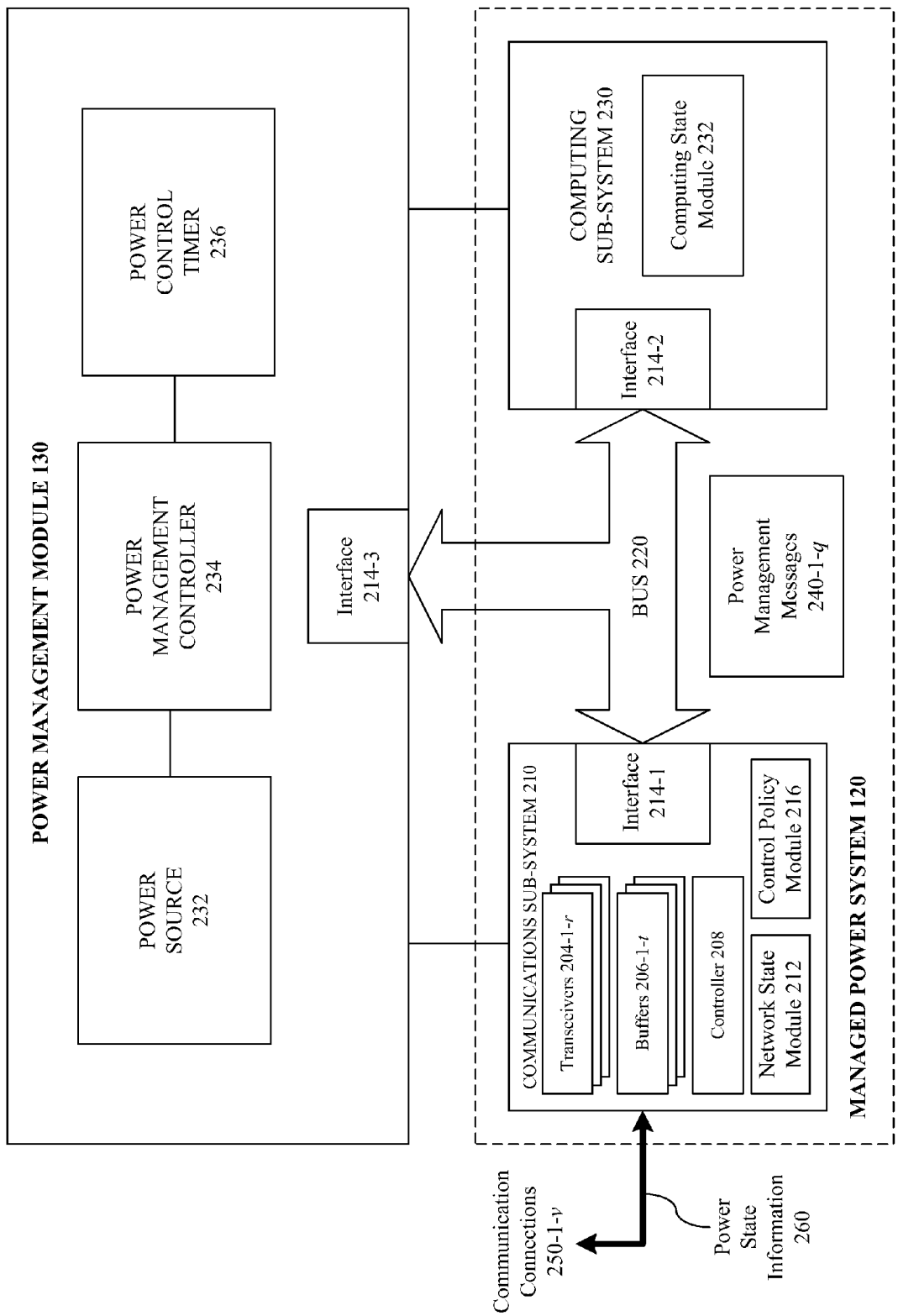
FIG. 2 illustrates one embodiment of an apparatus.

FIG. 2 illustrates a more detailed block diagram for a managed power system 120 and a power management module 130. In the illustrated embodiment shown in FIG. 2, the managed power system 120 may include a computing sub-system 230 and a communications sub-system 210. The computing sub-system 230 may further include a computing state module 232 and a power management interface 214-2. The communications sub-system 210 may further include one or more transceivers 204-1-$r$, one or more queues or buffers 26-1-$t$, a controller 208, a network state module 212, a power management interface 214-1, and a control policy module 216. The power management module 130 may further include a power source 212, a power management controller 234, and one or more power control timers 236. The power management module 130 may also include a power management interface 214-3. The interfaces 214-1, 214-2 and 214-3 may be coupled to a communications bus 220. Although FIG. 2 may show a limited number of elements in a certain arrangement by way of example, it can be appreciated that more or less elements may be employed in different arrangements for a given implementation.

In various embodiments, the managed power system 120 may include any electrical or electronic elements of the nodes 110-1-m consuming power from the power source 212 and suitable for power management operations. Power management techniques allow certain components of an electronic device or system (e.g., a computer system) to be powered down or put in an idle mode or sleep mode that requires less power than while in active operation, thereby reducing the total amount of energy consumed by a device over some period of time. The power management techniques may be implemented by power gating and/or clock gating various hardware elements of the managed power system 120, thereby conserving battery power.

More particularly, the managed power system 120 may include various electrical or electronic elements of the nodes 110-1-m that can operate in various power states drawing multiple levels of power from the power source 212 as controlled by the power management controller 234 of the power management module 130. The various power states may be defined by any number of power management schemes. In some cases, for example, the power states may be defined in accordance with the Advanced Configuration and Power Interface (ACPI) series of specifications, including their progeny, revisions and variants. In one embodiment, for example, the power states may be defined by the ACPI Revision 3.0a, Dec. 30, 2005 (the "ACPI Revision 3.0a Specification"). The ACPI series of specifications define multiple power states for electronic devices, such as global system states (Gx states), device power states (Dx states), sleeping states (Sx states), processor power states (Cx states), device and processor performance states (Px states), and so forth. It may be appreciated that other power states of varying power levels may be implemented as desired for a given set of design parameters and performance constraints. The embodiments are not limited in this context.

In some embodiments, the various electrical or electronic elements of the nodes 110-1-m suitable for power management operations may be generally grouped or organized into the communications sub-system 210 and the computing sub-system 230. It may be appreciated, however, that the sub-systems 210, 230 are provided by way of example for purposes of clarity and not limitation, and the managed power system 120 may include other electrical or electronic elements of the nodes 110-1-m suitable for power management operations by the power management module 130. For example, the nodes 110-1-m may typically include a computer monitor or display, such as a digital electronic display or an analog electronic display. Examples of digital electronic displays may include electronic paper, nixie tube displays, vacuum fluorescent displays, light-emitting diode displays, electroluminescent displays, plasma display panels, liquid crystal displays, thin-film transistor displays, organic light-emitting diode displays, surface-conduction electron-emitter displays, laser television displays, carbon nanotubes, nanocrystal displays, and so forth. An example for analog electronic displays may include cathode ray tube displays. Computer monitors are often placed in a sleep mode when an operating system detects that the computer system has not received any input from a user for a defined period of time. Other system components may include digital cameras, touch screens, video recorders, audio recorders, storage devices, vibrating elements, oscillators, system clocks, controllers, and other platform or system architecture equipment. These other system components can also be placed in a sleep or powered down state in order to conserve energy when the components are not in use. The computer system monitors input devices and wakes devices as needed. The embodiments are not limited in this context.

In various embodiments, the managed power system 120 may include the communications sub-system 210. The communications sub-system 210 may comprise various communications elements arranged to communicate information and perform communications operations between the nodes 110-1-m. Examples of suitable communications elements may include any electrical or electronic element designed to communicate information over the communications links 140-1, 140-2, including without limitation radios, transmitters, receivers, transceivers, chipsets, amplifiers, filters, control logic, interfaces, network interfaces, network interface cards (NICs), antennas, antenna arrays, digital signal processors, baseband processors, communications processors, media access controllers, memory units, oscillators, clocks, and so forth.

In various embodiments, the managed power system 120 may include the computing sub-system 230. The computing sub-system 230 may comprise various computing elements arranged to process information and perform computing operations for the nodes 110-1-m. Examples of suitable computing elements may include any electrical or electronic element designed to perform logical operations or process information, including without limitation processors, microprocessors, chipsets, controllers, microcontrollers, embedded controllers, clocks, oscillators, audio cards, video cards, multimedia cards, peripherals, memory units, memory controllers, video controllers, audio controllers, multimedia controllers, bus controllers, hubs, and so forth.

In various embodiments, the power management module 130 may comprise a power source 212. The power source 212 may be arranged to provide power to the elements of a node 110-1-m in general, and the managed power system 120 in particular. In one embodiment, for example, the power source 212 may be operative to provide varying levels of power to the sub-systems 210, 230. In various embodiments, the power source 212 may be implemented by a rechargeable battery, such as a removable and rechargeable lithium ion battery to provide direct current (DC) power, and/or an alternating current (AC) adapter to draw power from a standard AC main power supply.

In various embodiments, the power management module 130 may include a power management controller 234. The power management controller 234 may generally control power consumption for the managed power system 120. In one embodiment, the power management controller 234 may be operative to control varying levels of power provided to the sub-systems 210, 230 in accordance with certain defined power states. For example, the power management controller 234 may modify, switch, change or transition the power levels provided by the power source 212 to the sub-systems 210, 230 to a higher or lower power level, thereby effectively modifying a power state for the sub-systems 210, 230.

In various embodiments, the power management module 130 may include one or more power control timers 236. The power control timer 236 may be used by the power management controller 234 to maintain a certain power state for a given power state duration period or communications rate duration period. The power state duration period may represent a defined time interval one or more portions of the managed power system 120 is in a given power state. The communications rate duration period may represent a defined time interval the communications sub-system 210 communicates at a given communications rate. For example, the power management controller 234 may switch the communications sub-system 210 from a higher power state to a lower power state for a defined time interval set by the power state duration period, and when the time interval has expired, switch the communications sub-system 210 to the higher power state. Similarly, the power management controller 234 may switch the communications sub-system 210 from a faster communications rate to a slower communications rate for a defined time interval set by the communications rate duration period, and when the time interval has expired, switch the communications sub-system 210 to the faster communications rate.

In order to coordinate power management operations for a node 110-1-$m$, the sub-systems 210, 230 and the power management module 130 may communicate various power management messages 240-1-$q$ via a communications bus 220 and the respective power management interfaces 214-1, 214-2, and 214-3. To manage power for all the devices in a system, an operating system typically utilizes standard techniques for communicating control information over a particular Input/Output (I/O) interconnect. Examples of various I/O interconnects suitable for implementation as the communications bus 220 and associated interfaces 214 may include without limitation Peripheral Component Interconnect (PCI), PCI Express (PCIe), CardBus, Universal Serial Bus (USB), IEEE 1394 FireWire, and so forth.

Referring again to FIG. 2, the communications sub-system 210 may include a network state module 212. The network state module 212 may be arranged to monitor certain states or characteristics of the communications sub-system 210, such as the network traffic activity of the communications connections 250-1-$v$, capabilities information, communications operational states for communications state machines, and other operations for the various communications elements of the communications sub-system 210. The network state module 212 may send communications power management messages 240-1-$q$ to the power management module 130 with the measured characteristics. The power management module 130 may generate power state information 260 for the managed power system 120 based in part on the communications power management messages 240-1-$q$.

Similarly, the computing sub-system 230 may include a computing state module 232. The computing state module 232 may be arranged to monitor certain states or characteristics of the computing sub-system 230, such as the level of system activity, capabilities information, computing operations states for computing state machines, and other operations for the various computing elements of the computing sub-system 230. The computing state module 232 may send computing power management messages 240-1-$q$ to the power management module 130 with the measured characteristics. The power management module 130 may generate power state information 260 for the managed power system 120 based in part on the computing power management messages 240-1-$q$.

In general operation, the power management module 130-1 may perform power management operations for portions of the managed power system 120-1 of the node 110-1 based on power state information received from other portions of the node 110-1. In some cases, for example, the power management module 130-1 for the node 110-1 may be operative to receive computing power state information from the computing state module 232 of the computing sub-system 230-1 for the managed power system 120-1 over the communications bus 220. The power management module 130-1 may manage various communications power states and/or communications rates for the communications sub-system 210-1 of the managed power system 120-1 for the node 110-1 based on the computing power state information for the computing sub-system 230-1. The power management module 130-1 and the sub-systems 210-1, 230-1 may communicate the computing power state information over the communications bus 220 in accordance with various communications bus protocols.

The computing power state information may represent information explicitly or implicitly related to power states for the computing sub-system 230. The computing power state information may also represent various characteristics or attributes for the power states of the computing sub-system 230, such as such as computing power states, idle durations, resume latencies, and so forth. In one embodiment, for example, the computing power state information may include without limitation a computing power state parameter, a computing idle duration parameter, a computing resume latency parameter, and so forth.

As previously described, the power management module 130-1 may control various power states for the managed power system 120-1 in accordance with one or more power management standards, such as the ACPI standard. The ACPI standard may be suitable for defining the various power states for a portion of the managed power system 120-1, such as the computing sub-system 230-1 and/or the communications sub-system 210-1. For example, the power management module 130-1 may control power consumption for a processor and chipset of the communications sub-system 210-1 using different processor power consumption states (e.g., C0, C1, C2, and C3) as defined by the ACPI Revision 3.0a Specification. The power management module 130-1 may send power control commands to the computing sub-system 230-1 over the communications bus 220 and interfaces 214-2, 214-3.

In one embodiment, for example, the power management module 130 may control power consumption for the computing sub-system 230 using an abbreviated set of power states from the ACPI Revision 3.0a Specification referred to as system power states. The system power states define various power states specifically designed for the computing elements processing information for the nodes 110-1-$m$. Examples for the various system power states may be shown in Table 1 as follows:

TABLE 1

| System Power State | Description |
| --- | --- |
| S0 (On) | This power state indicates that the system is active and in full power mode. |
| S0i1 (Idle 1): Duration, Latency | This power state indicates that the system is active and in lower power mode than S0. |
| S0i2 (Idle 2): Duration, Latency | This power state indicates that the system is active and in lower power mode than S0i1. |
| S0i3 (Idle 3): Duration, Latency | This power state indicates that the system is active and in lower power mode than S0i2. |
| S2 (Off) | This power state indicates that the system is inactive and in off mode. |

As shown in Table 1, the system power states range from S0 to S2, where the S0 power state represents the highest power state with the maximum power draw, the S0i1-S0i3 power states represents incrementally lower power states relative to the S0 power state with correspondingly lower power draws, and the S2 power state represents the lowest power state with the minimum power draw (or none).

Some of the system power states have associated parameters. For example, the S0i1-S0i3 power states each have a pair of parameters referred to as a computing idle duration parameter and a computing resume latency parameter. The computing idle duration parameter represents an amount of time, or defined time interval, the computing sub-system 230 will remain in a given power state (e.g., S0i). The computing resume latency parameter represents an amount of time, or defined time interval, the computing sub-system 230 needs to exit a given power state (e.g., S0i) and enter a higher power state (e.g., S0). The computing idle duration parameter and the computing resume latency parameter for the system power states may be communicated by the power management messages 240-1-$q$ over the communications bus 220.

In various embodiments, the computing state module 232 may be arranged to generate the computing idle duration parameter and the computing resume latency parameter based on the capabilities of the computing sub-system 230-1. For example, the computing sub-system 230-1 may include various processors operating at different speeds, such as a host, application or system processor. In another example, the computing sub-system 230-1 may include various memory units operating at different read/write speeds. In still another example, the computing sub-system 230-1 may include various I/O devices, such as a keyboard, mouse, display, memory controllers, video controllers, audio controllers, storage devices (e.g., hard drives), expansion cards, co-processors, and so forth. The computing state module 232 may evaluate these and other computing capabilities of the computing sub-system 230-1, and generate the appropriate computing idle duration parameter and the computing resume latency parameter based on the evaluated capabilities of the computing sub-system 230-1.

Although in some embodiments the power states for the sub-systems 210-1, 230-1 may be similarly defined and in synchronization, in some embodiments the power states may also be differently defined and not synchronized for the sub-systems 210-1, 230-1. For example, the power management module 130-1 may control power consumption for a radio or network interface of the communications sub-system 210-1 using different power states than defined for the computing sub-system 230-1, as described further below.

In various embodiments, the communications sub-system 210-1 may include one or more transceivers 204-1-$r$ capable of operating at different communications rates. The transceivers 204-1-$r$ may comprise any communications elements capable of transmitting and receiving information over the various wired media types (e.g., copper, single-mode fiber, multi-mode fiber, etc.) and wireless media types (e.g., RF spectrum) for communications link 140-1, 140-2. Examples of the transceivers 204-1-$r$ may include various Ethernet-based PHY devices, such as a Fast Ethernet PHY device (e.g., 100Base-T, 100Base-TX, 100Base-T4, 100Base-T2, 100Base-FX, 100Base-SX, 100BaseBX, and so forth), a Gigabit Ethernet (GbE) PHY device (e.g., 1000Base-T, 1000Base-SX, 1000Base-LX, 1000Base-BX10, 1000Base-CX, 1000Base-ZX, and so forth), a 10 GbE PHY device (e.g., 10GBase-SR, 10GBase-LRM, 10GBase-LR, 10GBase-ER, 10GBase-ZR, 10GBase-LX4, 10GBase-CX4, 10GBase-Kx, 10GBase-T, and so forth), a 100 GbE PHY device, and so forth. The transceivers 204-1-$r$ may also comprise various radios or wireless PHY devices, such as for mobile broadband communications systems. Examples of mobile broadband communications systems include without limitation systems compliant with various Institute of Electrical and Electronics Engineers (IEEE) standards, such as the IEEE 802.11 standards for Wireless Local Area Networks (WLANs) and variants, the IEEE 802.16 standards for Wireless Metropolitan Area Networks (WMANs) and variants, and the IEEE 802.20 or Mobile Broadband Wireless Access (MBWA) standards and variants, among others. The transceivers 204-1-$r$ may also be implemented as various other types of mobile broadband communications systems and standards, such as a Universal Mobile Telecommunications System (UMTS) system series of standards and variants, a Code Division Multiple Access (CDMA) 2000 system series of standards and variants (e.g., CDMA2000 1xRTT, CDMA2000 EV-DO, CDMA EV-DV, and so forth), a High Performance Radio Metropolitan Area Network (HIPERMAN) system series of standards as created by the European Telecommunications Standards Institute (ETSI) Broadband Radio Access Networks (BRAN) and variants, a Wireless Broadband (WiBro) system series of standards and variants, a Global System for Mobile communications (GSM) with General Packet Radio Service (GPRS) system (GSM/GPRS) series of standards and variants, an Enhanced Data Rates for Global Evolution (EDGE) system series of standards and variants, a High Speed Downlink Packet Access (HSDPA) system series of standards and variants, a High Speed Orthogonal Frequency-Division Multiplexing (OFDM) Packet Access (HSOPA) system series of standards and variants, a High-Speed Uplink Packet Access (HSUPA) system series of standards and variants, and so forth. The embodiments are not limited in this context.

The transceivers 204-1-$r$ may individually or collectively operate at different communications rates or link rates. In one embodiment, for example, a single transceiver 204-1 may be capable of operating at various communications rates. In this case, when the control policy module 216 determines the communications sub-system 210-1 should operate at a different communications rate, the control policy module 216 may instruct the controller 208 to switch the single transceiver 204-1 to the desired communications rate. In another embodiment, for example, a first transceiver 204-1 may be capable of operating at a first communications rate, a second transceiver 204-2 may be capable of operating at a second communications rate, and so forth. When the control policy module 216 determines the communications sub-system 210-1 should operate at a different communications rate, the control policy module 216 may instruct the controller 208 to switch operations from the first transceiver 204-1 to one of the transceivers 204-2-$t$ arranged to provide the desired communications rate.

In various embodiments, the communications sub-system 210-1 may include one or more buffers 206-1-$t$. The buffers 206-1-$t$ may be operative to store network packets received by the transceivers 204-1-$r$, or ready for transmission by the transceivers 204-1-$r$. For example, the buffers 206-1-$t$ may be used to buffer packets until the communications rate for the transceiver has been completely switched or modified since switching communications rates for the transceivers 204-1-$r$ is typically not instantaneous. The buffers 206-1-$t$ may be implemented, for example, as standard First-In-First-Out (FIFO) queues.

In various embodiments, the communications sub-system 210-1 may include a controller 208. The controller 208 may be arranged to control switching between communications rates by the transceivers 204-1-$r$. In one embodiment, for example, the controller 208 may be arranged to implement fast switching of communications rates utilizing RPS techniques in accordance with the EEE project. RPS is a technique or mechanism for fast switching of communications rates, and is typically supported at both ends of a link. For example, the communications sub-system 210-1 of the first node 110-1 may implement RPS operations, and the communications sub-system 210-2 of the second node 110-2 may also implement corresponding RPS operations. The RPS operations may be implemented in a number of different ways, such as through a MAC frame handshake operation, for example. The controller 208 may be implemented as any computing elements or logic device capable of executing logical operations, such as processors, microprocessors, chipsets, controllers, microcontrollers, embedded controllers, and so forth.

In various embodiments, the communications sub-system 210-1 may include a control policy module 216. The control policy module 216 may be arranged to implement one or more control policies to determine when the controller 208 should have the transceivers 204-1-r switch communications rates. The control policy module 216 may implement control policies to enhance energy conservation for the nodes 110-1-m. For example, the control policy module 216 may implement control policies compatible with the EEE project.

In one embodiment, the control policy module 216 may be operative to receive computing power state information and communications state information. The control policy module 216 may receive the computing power state information indirectly from the power management module 130 via the communications bus 220 and the interfaces 214-1, 214-3. Alternatively, the control policy module 216 may receive the computing power state information directly from the computing sub-system 230 via the communications bus 220 and the interfaces 214-1, 214-2. The control policy module 216 may receive the communications state information from the network state module 212.

The control policy module 216 may receive the computing power state information and/or the communications state information, and evaluate or compare the computing power state information and the communications state information against the control policies programmed for the control policy module 216. The control policy module 216 may then determine a communications rate parameter for a transceiver 204-1-r based on the analysis of the computing power state information and the communications state information. The communications rate parameter may represent a given communications rate output providing a given level of power consumption programmed for the given computing power state information and communications state information inputs. The control policy module 216 may instruct the controller 208 to switch, change, transition or otherwise modify a communications rate for a transceiver 204-1-r based on the communications rate parameter.

The control policy module 216 may implement various types of control policies or rules to control when the controller 208 should switch communications rates. In one embodiment, for example, the control policy module 216 may receive a computing power state parameter, a computing idle duration parameter and/or a computing resume latency parameter as the computing power state information. The computing power state parameter may represent a computing power state for the computing sub-system 230. The computing power state parameter may be generated, for example, by the power management controller 234 based on the computing power state information received from the computing sub-system 230.

In one embodiment, the control policy module 216 may determine the communications rate parameter for the transceivers 204-1-r based on the computing power state parameter. For example, the control policy module 216 may have access to various control policies, rules or a lookup table (LUT) having certain communications rate parameters corresponding to certain computing power state parameters, examples of which may be shown in Table 2 as follows:

TABLE 2

| Computing Power State Parameter | Communications Rate Parameter |
| --- | --- |
| S0 (On) | CR0 - Fastest rate (e.g., 100 Gb/s) |
| S0i1 (Idle 1): Duration, Latency | CR1 - Next fastest rate (e.g., 10 Gb/s) |
| S0i2 (Idle 2): Duration, Latency | CR2 - Next fastest rate (e.g., 100 Mb/s) |
| S0i3 (Idle 3): Duration, Latency | CR3 - Next fastest rate (e.g., 10 Mb/s) |
| S2 (Off) | CR4 - Lowest rate (e.g., 0 Mb/s) |

As shown in Table 2, for example, the computing power state parameter representing the highest power state S0 for the computing sub-system 230-1 may have a corresponding communications rate parameter representing the fastest communications rate CR0 for the communications sub-system 210-1. When the control policy module 216 receives the computing power state information with a computing power state parameter representing S0, for example, the control policy module 216 may access the information of Table 2 to determine the communications rate parameter of CR0, and pass the communications rate parameter to the controller 208. The controller 208 may then switch the transceivers 204-1-r to the communications rate CR0 identified by the communications rate parameter.

In one embodiment, the control policy module 216 may determine the communications rate parameter for the transceivers 204-1-r based on the computing power state parameter and other information, such as various types of computing power state information, various types of communications state information, and so forth. The control policy module 216 may implement various control policies or rules to implement the various other types of information used to select a communications rate for the communications sub-system 210-1 at any given moment, thereby improving power management of the nodes 110-1-m.

In one embodiment, the control policy module 216 may determine the communications rate parameter for the transceivers 204-1-r based on the computing power state parameter and various types of the communications state information, such as a network utilization parameter. For example, the network state module 212 may be operative to monitor various communications connections 250-1-v for one or both of the communications links 140-1, 140-2 for a defined time period. The network state module 212 may calculate an average transmit period and an average receive period for the communications connections 250-1-v, and determine a network link utilization parameter based on the average transmit period and the average receive period. The control policy module 212 may receive the network link utilization parameter as the communications state information, and determine the communications rate parameter for the transceiver 204-1-r based on the computing power state information and the network link utilization parameter. By way of example, assume the computing power state parameter is set at S0i2, and the corresponding communications rate parameter for S0i2 is CR2. Further assume the network link utilization parameter indicates a high level of utilization of the communications connections 250-1-v, thereby implying a higher traffic load for the communications links 140-1, 140-2. The control policy module 216 may evaluate the network link utilization parameter, and select a communications rate parameter of CR1 rather than CR2 to account for the higher network link utilization parameter.

In one embodiment, the control policy module 216 may determine the communications rate parameter for the transceivers 204-1-r based on the computing power state parameter and various types of the communications state information, such as a buffer utilization parameter. The control policy module 216 may be arranged to switch link rates based on thresholds in input and/or output buffers 206-1-*t*. If a queue or buffer 206-1-*t* is above a certain threshold (or watermark), for example, then the control policy module 216 may instruct the controller 208 to switch the transceivers 204-1-*r* to a higher link rate. If a queue or buffer 206-1-*t* is below a certain threshold (or watermark), for example, then the control policy module 216 may instruct the controller 208 to switch the transceivers 204-1-*r* to a lower link rate. For example, the network state module 212 may be arranged to compare a number of packets in a buffer 206-1-*t* with a threshold value to form the buffer utilization parameter. The threshold value may represent a high watermark value or a low watermark value for the buffer 206-1-*t*. The network state module 212 may determine a buffer utilization parameter based on the comparison results. By way of example, assume the computing power state parameter is set at S0i2, and the corresponding communications rate parameter for S0i2 is CR2. Further assume the buffer utilization parameter indicates the number of packets stored by the buffers 206-1-*t* is below a low watermark value, thereby implying a lower traffic load for the communications links 140-1, 140-2. The control policy module 216 may evaluate the buffer utilization parameter, and select a communications rate parameter of CR3 rather than CR2 to account for the lower buffer utilization parameter.

In one embodiment, the control policy module 216 may determine the communications rate parameter for the transceivers 204-1-*r* based on the computing power state parameter and various other types of computing power state information, such as a computing idle duration parameter and a computing resume latency parameter. As previously described, the computing idle duration parameter represents a time interval the computing sub-system 230 will be in an idle state, and the computing resume latency parameter represents a time interval the computing sub-system 230 needs to switch power states. By way of example, assume the computing power state parameter is set at S0i2, and the corresponding communications rate parameter for S0i2 is CR2. Further assume the computing idle duration parameter is 100 millisecond (ms), and the computing resume latency parameter is 1 ms, thereby implying that the computing sub-system 230-1 will switch power states relatively soon with some time interval for the resume period. The control policy module 216 may evaluate the computing idle duration parameter and the computing resume latency parameter, and select a communications rate parameter of CR1 rather than CR2 to account for an anticipated switch to a higher power state by the computing sub-system 230-1.

In one embodiment, the control policy module 216 may determine the communications rate parameter for the transceivers 204-1-*r* based on the computing power state parameter, the computing idle duration parameter, the computing resume latency parameter, and the communications state information. The control policy module 216 may have multiple control policies or rules for each parameter similar to the previous examples, and select a communications rate for the transceivers 204-1-*r* accordingly.

In addition to, or in lieu of, performing power management operations by using the control policy module 216 to select a communications rate for the transceivers 204-1-*r* that saves energy, the power management controller 234 may perform power management directly by receiving communications state information from the communications sub-system 210-1, communications power state information from the communications sub-system 210-1, and/or the computing power state information from the computing sub-system 230-1, and determine a communications power state parameter appropriate for the communications sub-system 210-1. For example, in some embodiments the power states for the communications sub-system 210-1 and the computing sub-system 230-1 may be similarly defined and in synchronization. In this case, the power management controller 234 may match the communications power state with the computing power state. In some embodiments, however, the communications power state information may also be differently defined and not synchronized for the sub-systems 210, 230. For example, the power management module 130-1 may control power consumption for a radio or network interface of the communications sub-system 210-1 using different power states than defined for the computing sub-system 230-1. In one embodiment, for example, the power management module 130-1 may control power consumption for the communications sub-system 210-1 using a set of power states referred to as network link power management (NLPM) power states. The NLPM power states define various network link power states specifically designed for the communications elements of the communications sub-system 210-1 communicating information over the given communications links 140-1, 140-2. Examples for the various NLPM power states may be shown in Table 3 as follows:

TABLE 3

| NLPM Power State | Description |
| --- | --- |
| NL0 (On) | This power state indicates that the network link is active and in full power mode. |
| NL1 (Idle): Duration, Latency | This power state indicates that the network link is active and in low power mode. |
| NL2 (Sleep): Duration, Latency | This power state indicates that the network link is inactive and in sleep mode. |
| NL3 (Off) | This power state indicates that the network link is inactive and in off mode. |

As shown in Table 3, the NLPM power states range from NL0 to NL3, where the NL0 power state represents the highest power state with the maximum power draw, the NL1 and NL2 power states represent incrementally lower power states relative to the NL0 power state with correspondingly lower power draws, and the NL3 power state represents the lowest power state with the minimum power draw (or none). In this case, the power management controller 234 may switch the communications sub-system 210-1 to a communications power state (e.g., NL0-NL3) based on the computing power state parameter for the computing sub-system 230-1. In addition, the power management controller 234 may utilize various parameters associated with the NLPM power states, such as a communications idle duration parameter and a communications resume latency parameter. The communications idle duration parameter represents an amount of time, or defined time interval, the network link or communications sub-system 210-1 will remain in a given power state (e.g., NL1, NL2). The communications idle duration parameter allows the sub-systems 210-1, 230-1 to enter and exit the lower power states with a deterministic manner. The communications resume latency parameter represents an amount of time, or defined time interval, the network link or communications sub-system 210-1 needs to exit a given power state (e.g., NL1, NL2) and enter a higher power state (e.g., NL0). The communications resume latency parameter allows the sub-systems 210-1, 230-1 to determine how soon it can expect the communications sub-system 210-1 to wake up and be ready for providing services such as out-going transmission. The communications idle duration parameter and the communications resume latency parameter for the NLPM power states may be generated by the network state module 212, and communicated by the power management messages **240-1-*q* over the communications bus 220**.

In various embodiments, the network state module 212 may be arranged to generate the communications idle duration parameter and the communications resume latency parameter based on the capabilities of the communications sub-system 210-1. For example, the communications sub-system 210-1 may implement various buffers to store information received from the communications connections **250-1-*v*, such as network packets, and forward the information for servicing and processing by the computing sub-system 230-1. In another example, the communications sub-system 210-1 may also implement various buffers to store information received from the communications bus 220, such as network packets, and forward the information for communications by the communications sub-system 210-1 to other nodes 110-2-*m* over the communications connections 250-1-*v* via the communications links 140-1, 140-2. In yet another example, the communications sub-system 210-1 may include various wired or wireless transceiver operating at different communications speeds, such as the IEEE 802.3-2005 standard 10 Gigabit Ethernet (10GbE or 10GigE), the IEEE 802.3ba proposed standard 100 Gigabit Ethernet (100GbE or 100GigE), and so forth. In still another example, the communications sub-system 210-1 may include various processors operating at different speeds, such as baseband or communications processor. In still another example, the network state module 212 may monitor the rate of information being received over the communications connections 250-1-*v* via the communications links 140-1, 140-2. In this example, the network state module 212 of the communications sub-system 210-1 may monitor the communications links 140-1, 140-2 to measure packet inter-arrival times. Other examples of communications capabilities may include other network traffic load measurements on the communications links 140-1, 140-2 (e.g., synchronous traffic, asynchronous traffic, burst traffic, and so forth), a signal-to-noise ratio (SNR), a received signal strength indicator (RSSI), throughput of the communications bus 220, physical layer (PHY) speed, power state information 260 for other nodes 110-2-*m* received via one or more PMPDU 150-1-*s*, and so forth. The network state module 212 may evaluate these and other network or communications capabilities of the communications sub-system 210-1, and generate the appropriate communications idle duration parameter and the communications resume latency parameter based on the evaluated capabilities of the communications sub-system 210-1. The power management controller 234 may use any of these parameters in various combinations to determine an appropriate communications power state for the communications sub-system 210-1, and send a power management message 240-1-*q* to the communications sub-system 210-1 with a communications power state parameter to place the communications sub-system 210-1** in a communications power state (e.g., an NLPM power state NL0-NL3) corresponding to the communications power state parameter.

Figure 3:
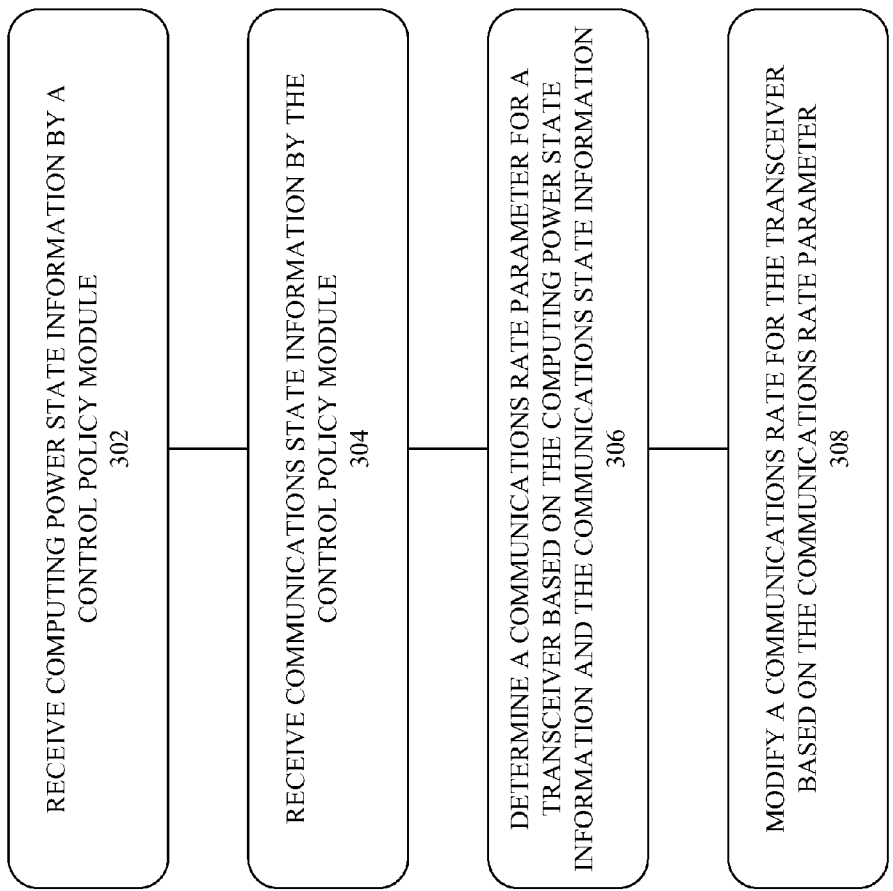
FIG. 3 illustrates one embodiment of a first logic diagram.

FIG. 3 illustrates a logic flow 300 in accordance with one or more embodiments. The logic flow 300 may be performed by various systems and/or devices and may be implemented as hardware, software, and/or any combination thereof, as desired for a given set of design parameters or performance constraints. For example, the logic flow 300 may be implemented by a logic device (e.g., processor) and/or logic (e.g., instructions, data, and/or code) to be executed by a logic device. For purposes of illustration, and not limitation, the logic flow 300 is described with reference to FIGS. 1 and 2.

The logic flow 300 may illustrate various operations for the nodes **110-1-*m* in general, and the managed power system 120 and the power management module 130 in particular. As shown in FIG. 3, the logic flow 300 may receive computing power state information by a control policy module at block 302. The logic flow 300 may receive communications state information by the control policy module at block 304. The logic flow 300 may determine a communications rate parameter for a transceiver based on the computing power state information and the communications state information at block 306. The logic flow 300 may modify a communications rate for the transceiver based on the communications rate parameter at block 308**. The embodiments are not limited in this context.

In one embodiment, the logic flow 300 may receive computing power state information by a control policy module at block 302. For example, the control policy module 216 may receive computing power state information indirectly from the power management controller 234 via the communications bus 220 and interfaces 214-1, 214-3, or directly from the computing sub-system 230 via the communications bus 220 and interfaces 214-1, 214-2. The computing power state information may include without limitation a computing power state parameter, a computing idle duration parameter, a computing resume latency parameter, and so forth.

In one embodiment, the logic flow 300 may receive communications state information by the control policy module at block 304. For example, the control policy module 216 may receive communications state information from the network state module 212. The communications state information may include without limitation a network utilization parameter, a buffer utilization parameter, and so forth.

In one embodiment, the logic flow 300 may determine a communications rate parameter for a transceiver based on the computing power state information and the communications state information at block 306. For example, the control policy module 216 may determine a communications rate parameter (e.g., CR0-CR4) for a transceiver **204-1-*r*** based on the computing power state information and the communications state information.

In one embodiment, the logic flow 300 may modify a communications rate for the transceiver based on the communications rate parameter at block 308. For example, the control policy module 216 may modify a communications rate for the transceiver **204-1-*r*** based on the communications rate parameter.

Figure 4:
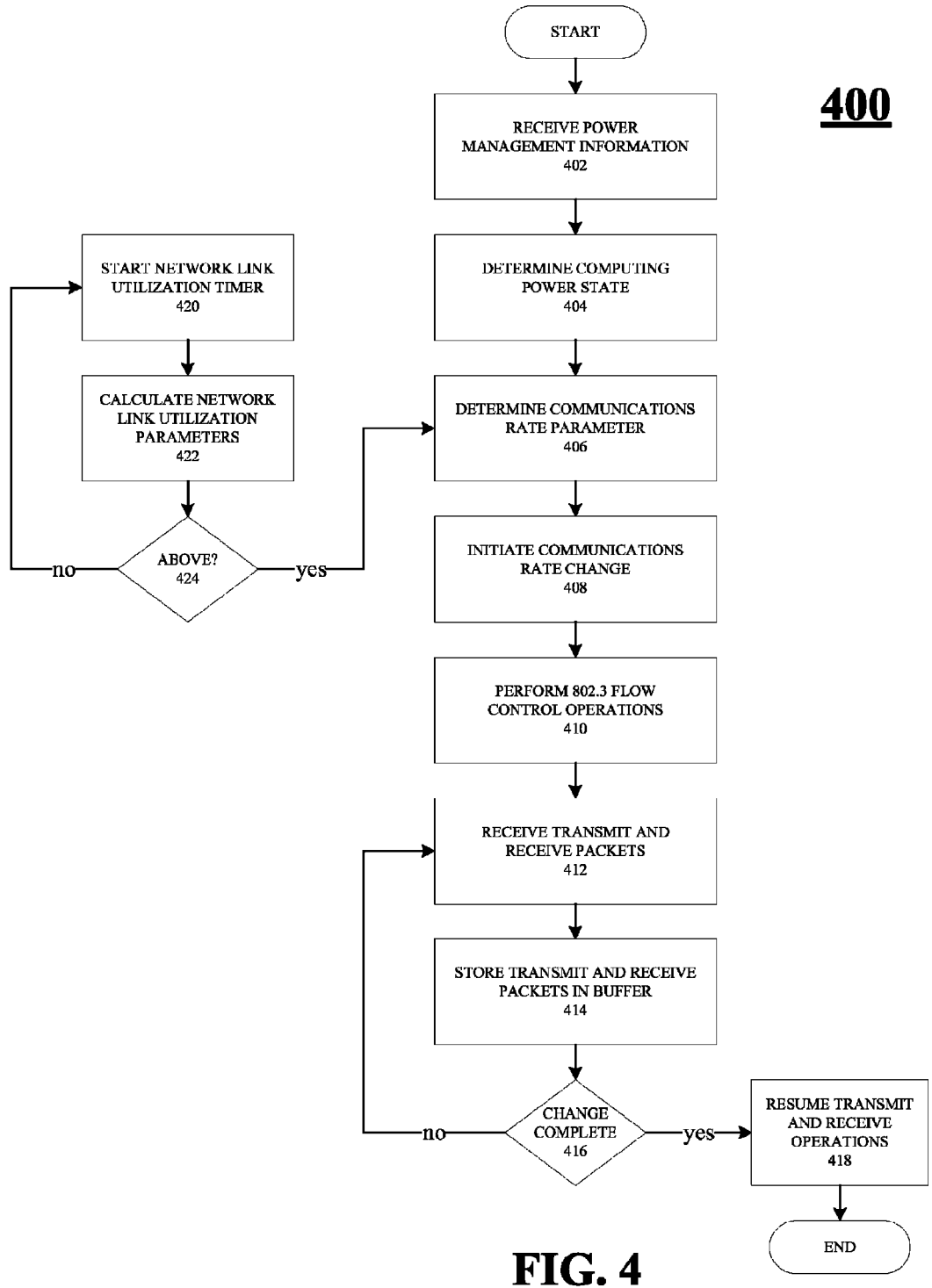
FIG. 4 illustrates one embodiment of a second logic diagram.

FIG. 4 illustrates a logic flow 400 in accordance with one or more embodiments. The logic flow 400 may be performed by various systems and/or devices and may be implemented as hardware, software, and/or any combination thereof, as desired for a given set of design parameters or performance constraints. For example, the logic flow 300 may be implemented by a logic device (e.g., processor) and/or logic (e.g., instructions, data, and/or code) to be executed by a logic device. For purposes of illustration, and not limitation, the logic flow 400 is described with reference to FIGS. 1 and 2.

The logic flow 400 may illustrate various operations for the nodes **110-1-*m* in general, and the managed power system 120 and the power management module 130 in particular. The illustrated embodiment shown in FIG. 4 described a more detailed logic flow for implementing a control policy for the control policy module 216 of the communications sub-system 210-1. As shown in FIG. 4, the power management controller 234 may receive at block 402 power management information from various sources of a node 110-1-*m*, including an operating system (OS), various device drivers, various devices and so forth. The power management controller 234** may determine a computing power state parameter for the computing sub-system 230-1 using the power management information at block 404. The power management controller 234 may send the computing power state parameter to the control policy module 216, which is received as one input for the control policy module 216. The control policy module 216 may also receive a second input from the network state module 212. For example, the network state module 212 may start a network link utilization timer at block 420, and calculate one or more network link utilization parameters at block 422. The network state module 212 may determine whether the network utilization parameter is above a certain threshold value at diamond 424. If not, the network state module 212 may continue to re-calculate the network link utilization parameters at blocks 420, 422 until the network link utilization parameters are above the threshold value at diamond 424. When this occurs, the network state module 212 may pass the network link utilization parameters to the control policy module 216 as the second input. The control policy module 216 may take the first and second inputs, and determine a communications rate parameter for the communications sub-system 210-1 using the inputs. The controller 208 may receive the communications rate parameter from the control policy module 216, and initiate a modification in a communications rate for one or more transceivers 204-1-r at block 408. At block 410, the controller 208 may perform flow control operations to modify the transceivers 204-1-r of the communications sub-system 210-1 of the first node 110-1, as well as one or more transceivers of a network endpoint communicating with the first node 110-1, such as the transceivers 204-1-r of the communications sub-system 210-2 of the second node 110-2. As the controller 208 performs the needed operations to switch the communications rates for the two sets of transceivers of nodes 110-1, 110-2, the communications sub-system 210-1 may continue to receive transmit and receive packets for the transceivers 204-1-r of the communications sub-system 210-1 at block 412. The controller 208 may store the transmit and receive packets in one or more of the buffers 206-1-t during switching operations at block 414. The controller 208 may determine whether the switching operations are complete at diamond 416. If not, the controller 208 may continue buffering the packets at block 412, 414 until the switching operations are completed. Once the switching operations are completed at diamond 416, the communications sub-system 210-1 may continue transmit and receive operations at block 418.

In some cases, various embodiments may be implemented as an article of manufacture. The article of manufacture may include a computer-readable medium or a storage medium arranged to store logic and/or data for performing various operations of one or more embodiments. Examples of computer-readable media or storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Examples of what could be claimed include the following:

The invention claimed is:

1. An apparatus, comprising:
 a communications sub-system having a control policy module, a controller and a first transceiver capable of operating at different communications rates, the control policy module operative to receive computing power state information and communications state information, compare the computing power state information and the communications state information against one or more control policies programmed for the control policy module, determine a communications rate parameter for the first transceiver based on the comparing of the computing power state information and the communications state information, instruct the controller to modify a communications rate for the first transceiver based on the communications rate parameter, receive a computing power state parameter with the computing power state information, and determine the communications state parameter for the first transceiver based on the computing power state parameter and the communications state information, the communications state information comprises a network link utilization parameter.

2. The apparatus of claim 1, the control policy module operative to determine the communications rate parameter for the first transceiver based on the computing power state parameter.

3. The apparatus of claim 1, the control policy module to receive, a computing idle duration parameter, and a computing resume latency parameter, and determine the communications rate parameter for the first transceiver based on the computing power state parameter, the computing idle duration parameter, the computing resume latency parameter, and the communications state information.

4. The apparatus of claim 1, comprising a network state module operative to monitor a communications link for a defined time period, calculate an average transmit period and an average receive period, and determine the network link utilization parameter based on the average transmit period and the average receive period.

5. The apparatus of claim 1, the control policy module operative to receive the network link utilization parameter as the communications state information, and determine the communications rate parameter for the first transceiver based on the computing power state information and the network link utilization parameter.

6. The apparatus of claim 1, comprising a buffer to couple to the transceiver, the buffer operative to buffer packets for the first transceiver, the network state module to compare a number of packets in the buffer with a threshold value, and determine a buffer utilization parameter based on the comparison.

7. The apparatus of claim 1, the control policy module operative to receive a buffer utilization parameter as the communications state information, and determine the communications rate parameter for the first transceiver based on the computing power state information and the buffer utilization parameter.

8. The apparatus of claim 1, comprising a buffer to couple to the transceiver, the buffer operative to buffer packets until the communications rate for the transceiver has been modified.

9. The apparatus of claim 1, the controller to perform flow control operations to modify a communications rate for a second transceiver based on the communications rate parameter.

10. A system, comprising:
a node having a managed power system with a digital electronic display and a communications sub-system, the communications sub-system having a first transceiver, a controller, and a control policy module, the first transceiver capable of operating at different communications rates, the control policy module operative to receive computing power state information and communications state information, compare the computing power state information and the communications state information against one or more control policies programmed for the control policy module, determine a communications rate parameter for the first transceiver based on the comparing of the computing power state information and the communications state information, instruct the controller to modify a communications rate for the first transceiver based on the communications rate parameter, receive a computing power state parameter with the computing power state information, and determine the communications state parameter for the first transceiver based on the computing power state parameter and the communications state information, the communications state information comprises a network link utilization parameter.

11. The system of claim 10, comprising a power management module having a power management controller operative to receive computing power state information from a computing sub-system, the computing power state information to include a computing idle duration parameter and a computing resume latency parameter, the power management controller to determine the computing power state parameter for the computing sub-system, and send a power management message to the control policy module with the computing power state information including the computing power state parameter, the computing idle duration parameter and the computing resume latency parameter.

12. The system of claim 10, comprising a computing sub-system having a computing state module operative to generate the computing power state information for the computing sub-system, and send a power management message with the computing power state information to a power management module.

13. The system of claim 10, the communications sub-system having a second transceiver, the control policy module to switch operations from the first transceiver to a second transceiver to modify communications rates.

14. A method, comprising:
receiving computing power state information by a control policy module;
receiving communications state information by the control policy module
comparing a computing power state information and a communications state information against one or more control policies;
determining a communications rate parameter for a transceiver based on the comparing of the computing power state information and the communications state information; and
modifying a communications rate for the transceiver based on the communications rate parameter;
receiving a computing power state parameter with the computing power state information by the control policy module operative, and
determining the communications state parameter for the first transceiver based on the computing power state parameter and the communications state information,
the communications state information comprises a network link utilization parameter.

15. The method of claim 14, comprising:
receiving computing idle duration parameter and a computing resume latency parameter as the computing power state information; and
determining the communications rate parameter for the transceiver based on the computing power state parameter, the computing idle duration parameter, the computing resume latency parameter, and the communications state information.

16. The method of claim 14, comprising:

monitoring a communications link for a defined time period;

calculating an average transmit period and an average receive period; and determining the network link utilization parameter based on the average transmit period and the average receive period.

17. The method of claim 14, comprising:

receiving the network link utilization parameter as the communications state information; and determining the communications rate parameter for the transceiver based on the computing power state information and the network link utilization parameter.

18. The method of claim 14, comprising:

storing packets for the first transceiver in a buffer;

comparing a number of packets in the buffer with a threshold value; and determining a buffer utilization parameter based on the comparison.

19. The method of claim 14, comprising:

receiving a buffer utilization parameter as the communications state information;

and determining the communications rate parameter for the transceiver based on the computing power state information and the buffer utilization parameter.

20. An article comprising a non-transitory computer-readable medium containing instructions that if executed enable a system to:

receive computing power state information by a control policy module;

receive communications state information by the control policy module;

compare the computing power state information and the communications state information against one or more control policies programmed for the control policy module;

determine a communications rate parameter for a transceiver based on the comparing of the computing power state information and the communications state information;

modify a communications rate for the transceiver based on the communications rate parameter;

receive a computing power state parameter with the computing power state information by the control policy module; and determine the communications state parameter for the first transceiver based on the computing power state parameter and the communications state information, the communications state information comprises a network link utilization parameter.

21. The article of claim 20, further comprising instructions that if executed enable the system to:

receive the computing power state parameter, a computing idle duration parameter and a computing resume latency parameter as the computing power state information; and determine the communications rate parameter for the transceiver based on the computing power state parameter, the computing idle duration parameter, the computing resume latency parameter, and the communications state information.

22. The article of claim 20, further comprising instructions that if executed enable the system to: receive the network link utilization parameter as the communications state information; and determine the communications rate parameter for the transceiver based on the computing power state information and the network link utilization parameter.

23. The article of claim 20, further comprising instructions that if executed enable the system to:

receive a buffer utilization parameter as the communications state information; and determine the communications rate parameter for the transceiver based on the computing power state information and the buffer utilization parameter.

* * * * *

UNITED STATES PATENT AND TRADEMARK OFFICE
CERTIFICATE OF CORRECTION

PATENT NO. : 8,156,353 B2
APPLICATION NO. : 12/208824
DATED : April 10, 2012
INVENTOR(S) : Jr-Shian Tsai Page 1 of 1

It is certified that error appears in the above-identified patent and that said Letters Patent is hereby corrected as shown below:

In column 22, line 41, in claim 14, after "module" insert -- ; --.

Signed and Sealed this
Tenth Day of July, 2012

David J. Kappos
*Director of the United States Patent and Trademark Office*

UNITED STATES PATENT AND TRADEMARK OFFICE
CERTIFICATE OF CORRECTION

PATENT NO. : 8,156,353 B2
APPLICATION NO. : 12/208824
DATED : April 10, 2012
INVENTOR(S) : Jr-Shian Tsai Page 1 of 1

It is certified that error appears in the above-identified patent and that said Letters Patent is hereby corrected as shown below:

In column 21, line 8, in claim 1, before "parameter for" delete "state" and insert -- rate --, therefor.

In column 22, line 8, in claim 10, before "parameter for" delete "state" and insert -- rate --, therefor.

In column 22, line 54, in claim 14, before "parameter for" delete "state" and insert -- rate --, therefor.

In column 24, line 10, in claim 20, before "parameter for" delete "state" and insert -- rate --, therefor.

Signed and Sealed this
Twenty-eighth Day of August, 2012

David J. Kappos
*Director of the United States Patent and Trademark Office*